United States Patent
Athalye et al.

(10) Patent No.: US 9,244,517 B2
(45) Date of Patent: *Jan. 26, 2016

(54) COOLING APPLIANCE RATING AWARE DATA PLACEMENT

(71) Applicant: International Business Machines Corporation, Armonk, NY (US)

(72) Inventors: Jay A. Athalye, San Jose, CA (US); Abhinay R. Nagpal, Pune (IN); Sandeep R. Patil, Elmsford, NY (US); Yan W. Stein, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 14/031,313

(22) Filed: Sep. 19, 2013

(65) Prior Publication Data

US 2014/0019784 A1 Jan. 16, 2014

Related U.S. Application Data

(63) Continuation of application No. 12/650,356, filed on Dec. 30, 2009, now Pat. No. 8,566,619.

(51) Int. Cl.
  *G06F 1/32* (2006.01)
  *G06F 1/20* (2006.01)
  *G06F 9/48* (2006.01)
(52) U.S. Cl.
  CPC .............. *G06F 1/3225* (2013.01); *G06F 1/206* (2013.01); *G06F 1/3203* (2013.01); *G06F 9/4856* (2013.01); *Y02B 60/1275* (2013.01); *Y02B 60/144* (2013.01); *Y02B 60/162* (2013.01)

(58) Field of Classification Search
  CPC ........ A61B 18/02; G06F 1/206; G06F 1/3203
  USPC .......................................................... 713/300
  See application file for complete search history.

(56) References Cited

U.S. PATENT DOCUMENTS

| | | | |
|---|---|---|---|
| 5,732,215 A * | 3/1998 | Boutaghou et al. | 710/74 |
| 5,745,375 A | 4/1998 | Reinhardt et al. | |
| 6,243,768 B1 * | 6/2001 | Khandekar | 710/35 |
| 6,574,104 B2 | 6/2003 | Patel et al. | |
| 6,795,928 B2 | 9/2004 | Bradley et al. | |

(Continued)

OTHER PUBLICATIONS

"U.S. Appl. No. 12/650,356 Final Office Action", Apr. 11, 2013, 14 pages.

(Continued)

*Primary Examiner* — Jaweed A Abbaszadeh
*Assistant Examiner* — Alyaa T Mazyad
(74) *Attorney, Agent, or Firm* — DeLizio Law, PLLC (57) ABSTRACT

A dataset is identified as a heat-intensive dataset based, at least in part, on the dataset being related to heat generation at a source storage device exceeding a heat rise limit. The source storage device hosts the heat-intensive dataset and the heat-intensive dataset comprises non-executable data. A first cooling area of a plurality of cooling areas is selected to accommodate the heat generation based, at least in part, on cooling characteristics of a plurality of cooling appliances of the plurality of cooling areas. The source storage device is associated with a second cooling area. A target storage device associated with the first cooling area is determined. The heat-intensive dataset is moved from the source storage device to the target storage device.

18 Claims, 7 Drawing Sheets

(56) References Cited

U.S. PATENT DOCUMENTS

| | | | |
|---|---|---|---|
| 6,829,713 | B2 | 12/2004 | Cooper et al. |
| 6,990,593 | B2 | 1/2006 | Nakagawa |
| 6,993,571 | B2 | 1/2006 | Kistler |
| 7,197,433 | B2 | 3/2007 | Patel et al. |
| 7,272,735 | B2 | 9/2007 | Fung |
| 7,373,268 | B1 | 5/2008 | Viredaz et al. |
| 7,426,453 | B2 | 9/2008 | Patel et al. |
| 7,447,920 | B2 | 11/2008 | Sharma et al. |
| 7,590,873 | B2 | 9/2009 | Takahashi et al. |
| 8,380,942 | B1* | 2/2013 | Corddry et al. ............ 711/154 |
| 2003/0193777 | A1 | 10/2003 | Friedrich et al. |
| 2004/0194087 | A1 | 9/2004 | Brock et al. |
| 2006/0112286 | A1 | 5/2006 | Whalley et al. |
| 2006/0288241 | A1 | 12/2006 | Felter et al. |
| 2008/0005410 | A1 | 1/2008 | Mies et al. |
| 2008/0014104 | A1 | 1/2008 | Huang et al. |
| 2008/0234873 | A1 | 9/2008 | Gorbatov et al. |
| 2009/0106571 | A1 | 4/2009 | Low et al. |
| 2009/0125737 | A1 | 5/2009 | Brey et al. |
| 2009/0222562 | A1 | 9/2009 | Liu et al. |
| 2009/0235042 | A1 | 9/2009 | Petrocelli |
| 2009/0240964 | A1 | 9/2009 | Pfeiffer |
| 2009/0259345 | A1 | 10/2009 | Kato et al. |
| 2009/0282272 | A1* | 11/2009 | Bestgen et al. ............ 713/320 |
| 2009/0302143 | A1 | 12/2009 | Bayang et al. |
| 2010/0161282 | A1 | 6/2010 | Bell, Jr. et al. |
| 2010/0162216 | A1 | 6/2010 | Bell et al. |
| 2010/0211669 | A1 | 8/2010 | Dalgas et al. |
| 2010/0274826 | A1* | 10/2010 | Takata et al. .................. 707/812 |
| 2011/0161712 | A1 | 6/2011 | Athalye et al. |
| 2011/0211664 | A1* | 9/2011 | Brown et al. ..................... 378/4 |

OTHER PUBLICATIONS

"U.S. Appl. No. 12/650,356 Office Action", Aug. 30, 2012, 22 pages.

Bash, Cullen et al., "Data center workload placement for energy efficiency", ASME Conference Proceedings ASME, vol. 2007, No. 33129 Dec. 1, 2007, pp. 437-446.

Durani, Vineeta, "IBM Unveils Plan to Combat Data Center Energy Crisis; Allocates $1 Billion to Advance "Green" Technology and Services", http://www-03.ibm.com/press/us/en/pressrelease/21524.wss (Obtained from the Internet on Nov. 12, 2009) May 10, 2007, 6 pages.

Energy Vortex, "HP Announces "Smart" Cooling Solution for Data Centers", http://www.energyvortex.com/pages/headlinedetails.cfm?id=701&archive=1 (Obtained from the Internet on Nov. 11, 2009) No publication date found., 2 pages.

Fichera, Richard et al., "Power and Cooling Heat Up the Data Center", http://www.forrester.com/Research/Document/Excerpt/0,7211,38746,00.html (Obtained from the Internet on Nov. 12, 2009) Mar. 8, 2006, 2 pages.

Gartner, Inc. "Gartner Says a Green Data Centre Means More than Energy Efficiency", http://www.gartner.com/it/page.jsp?id=781012&format=print (Obtained from the Internet on Nov. 12, 2009) Oct. 20, 2008, 2 pages.

IBM, "Data Center Power Management Enhancement for Energy Efficiency", May 4, 2009, 3 pages.

IBM, "Dynamic Thermal Mapping and Trend Analysis As a Control Mechanism for HVAC Systems in Data Centers", Mar. 27, 2006, 3 pages.

IBM, "Energy efficient cooling system for Data Center", Apr. 23, 2009, 4 pages.

IBM, "Item location using a programmable RFID Tag location device", http://www.priorartdatabase.com/IPCOM/000160360/ (Obtained from the Internet on Nov. 11, 2009) No publication date found., 2 pages.

IBM, "Software as a Service (SaaS)", http://www-304.ibm.com/jct01005c/isv/marketing/saas/index.html (Obtained from the Internet on Nov. 11, 2009) No publication date found., 2 pages.

Jeong, et al., "Workload Placement Models: Workload Placement Algorithm that maximizes the uniformity of the temperatures of a DC", http://nsfcac.rutgers.edu/greencomputing/workshop/presentations/gc-workshop-myong.pdf (Obtained from the Internet on Nov. 11, 2009) 2009, 1 page.

Karabuto, Alex, "HDD Diet 2: Power Consumption and Heat Dissipation of Enterprise Hard Disk Drives", http://ixbtlabs.com/articles2/storage/hddpower-pro.html (Obtained from the Internet on Nov. 11, 2009) Mar. 2, 2006, 15 pages.

Karabuto, Alex, "HDD Diet: Power Consumption and Heat Dissipation", http://ixbtlabs.com/articles2/storage/hddpower.html (Obtained from the Internet on Nov. 11, 2009) Jul. 11, 2005, 16 pages.

Microsoft "Win32_DiskDrive Class", http://msdn.microsoft.com/en-us/library/aa394132(VS.85).aspx (Obtained from the Internet Nov. 11, 2009) Nov. 3, 2009, 14 pages.

Nsharma, , "Script to retrive table statistics", http://www.ibm.com/developerworks/blogs/page/nsharma?entry=script_to_retrive_table_statistics (Obtained from the Internet on Nov. 11, 2009) Dec. 15, 2008, 1 page.

Patel, D., "Storage File Mapping in Databases", http://www.parallelprose.com/parallelprose/white_papers/veritas_File_Mapping.pdf (Obtained from the Internet on Nov. 11, 2009) Apr. 22, 2003, 11 pages.

Patterson, Michael K., "The effect of data center temperature on energy efficiency", http://www.eco-info.org/IMG/pdf/Michael_K_Patterson_—_The_effect_of_Data_Center_Temperature_on_Energy_Efficiency.pdf (Obtained from the Internet on Nov. 13, 2009) Jan. 1, 2008, pp. 1167-1174.

Rosenberg, David, "IBM takes to Amazon's EC2 cloud", http://news.cnet.com/8301-13846_3-10161864-62.html (Obtained from the Internet on Nov. 11, 2009) Feb. 11, 2009, 2 pages.

Shah, Amip J. et al., "Exergy analysis of data center thermal management systems", ASME Conference Proceedings ASME, vol. 2003, No. 37084 Dec. 1, 2003, pp. 437-446.

Srinkantaiah, , "Energy Aware Consolidation for Cloud Computing", Nov. 14, 2008, 9 pages.

Tang, Qinghui et al., "Thermal Aware Task Scheduling for Datacenters through Minimizing Heat Recirculation", Sep. 2007, pp. 129-138.

The Engineering Tool Box, "Fans—Efficiency and Power Consumption", http://www.engineeringtoolbox.com/fans-efficiency-power-consumption-d_197.html (Obtained from the Internet on Nov. 11, 2009) 2005, 3 pages.

Weston, Rusty, "Greening the Data Center", http://www.smartenterprisemag.com/articles/2008winter/markettrends2.jhtml (Obtained from the Internet on Nov. 11, 2009) No publication date found., 2 pages.

Willeford, Timothy et al., "IBM Project Big Green Tackles Global Energy Crisis", http://www-03.ibm.com/press/us/en/pressrelease/24395.wss (Obtained from the Internet on Nov. 12, 2009) Jun. 11, 2008.

* cited by examiner

COOLING APPLIANCE RATING AWARE DATA PLACEMENT

RELATED APPLICATIONS

This application claims the priority benefit of U.S. patent application Ser. No. 12/650,356 filed on Dec. 30, 2009.

BACKGROUND

Embodiments of the inventive subject matter generally relate to the field of data center management and, more particularly, to heat intensive data placement.

A variety of cooling mechanisms are used in data centers to dissipate heat generated by physical storage devices in the data centers. The cooling mechanisms are also used to ensure that the physical storage devices operate within safe operating temperatures. The cooling mechanisms heavily impact electric power consumption of the data centers. Consequently, the cooling mechanisms are a significant cost of the data centers.

SUMMARY

Embodiments include a method comprising identifying a dataset as a heat-intensive dataset based, at least in part, on the dataset being related to heat generation at a source storage device exceeding a heat rise limit. The source storage device hosts the heat-intensive dataset and the heat-intensive dataset comprises non-executable data. A first cooling area of a plurality of cooling areas is selected to accommodate the heat generation based, at least in part, on cooling characteristics of a plurality of cooling appliances of the plurality of cooling areas. A target storage device associated with the first cooling area is determined. The heat-intensive dataset is moved from the source storage device to the target storage device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to moving datasets from one physical storage device to another physical storage device within a data center, in some implementations, operations for dynamic placement of heat intensive datasets may be implemented over a network of data centers, storage pools, etc. In other instances, well-known instruction instances, protocols, structures, and techniques have not been shown in detail in order not to obfuscate the description.

The size of physical storage devices continues getting smaller, while the storage capacity of the physical storage devices and the computational power of processors increase. This results in an increase in computational power, per volume, of data centers, and an increase in power density. This, in turn, results in higher heat production in the data centers. Cooling mechanisms used to cool the data centers also consume power and contribute to a further increase in power density. Existing cooling mechanisms rely on cooling appliances with a variety of cooling characteristics (e.g., different ratings, motor size, cooling efficiency, power consumption, etc.) to cool the physical storage devices. The power consumed by the cooling appliances is dependent on their cooling characteristics. For example, a fan with 1 kW-0.4 rating consumes less power but generates less cool air, while a fan with 100 kW-0.93 rating consumes more power but also generates more air to act as a coolant. This information about cooling characteristics and power consumption of the cooling appliances can inform placement of data on the physical storage devices.

Dataset placement can be dynamically adapted based on a data center's environment, which is at least defined by characteristics of the various cooling appliances in the data center, and heat generating information about the dataset. This adaptive dataset placement can place datasets to intelligently utilize cooling appliances to cool the physical storage devices, which can lead to reduced power consumption. Adaptive dataset placement determines whether a dataset is a "heat-intensive dataset." To determine whether a dataset is a heat-intensive dataset, adaptive dataset placement takes into account operations on the dataset and attributes of the host physical storage device to determine if the dataset corresponds to heat generation beyond a heat rise threshold. Adaptive dataset placement also considers a cost of moving a heat-intensive dataset, as well as any policies that may govern the dataset and/or the datacenter. Dynamically adapting placement of heat-intensive datasets to an environment can ensure that highest rated cooling appliances are used to cool datasets that correspond to a highest heat generation, and that lower rated cooling appliances are used to cool datasets that cause comparatively less heat generation. In other words, dynamic placement of datasets based on heat dissipation capabilities of a data center can ensure that appropriate cooling appliances are used to cool appropriate datasets (i.e., physical storage devices that host the datasets). Adapting the datasets to the data center environment can reduce hot and cold spots in the data center and can also preclude changing the data center environment (e.g., physically moving the storage devices or cooling appliances) or preclude categorizing specific physical storage devices for specific types of data. Maintaining optimal cooling of the physical storage devices can also help reduce the data center costs.

Figure 1:
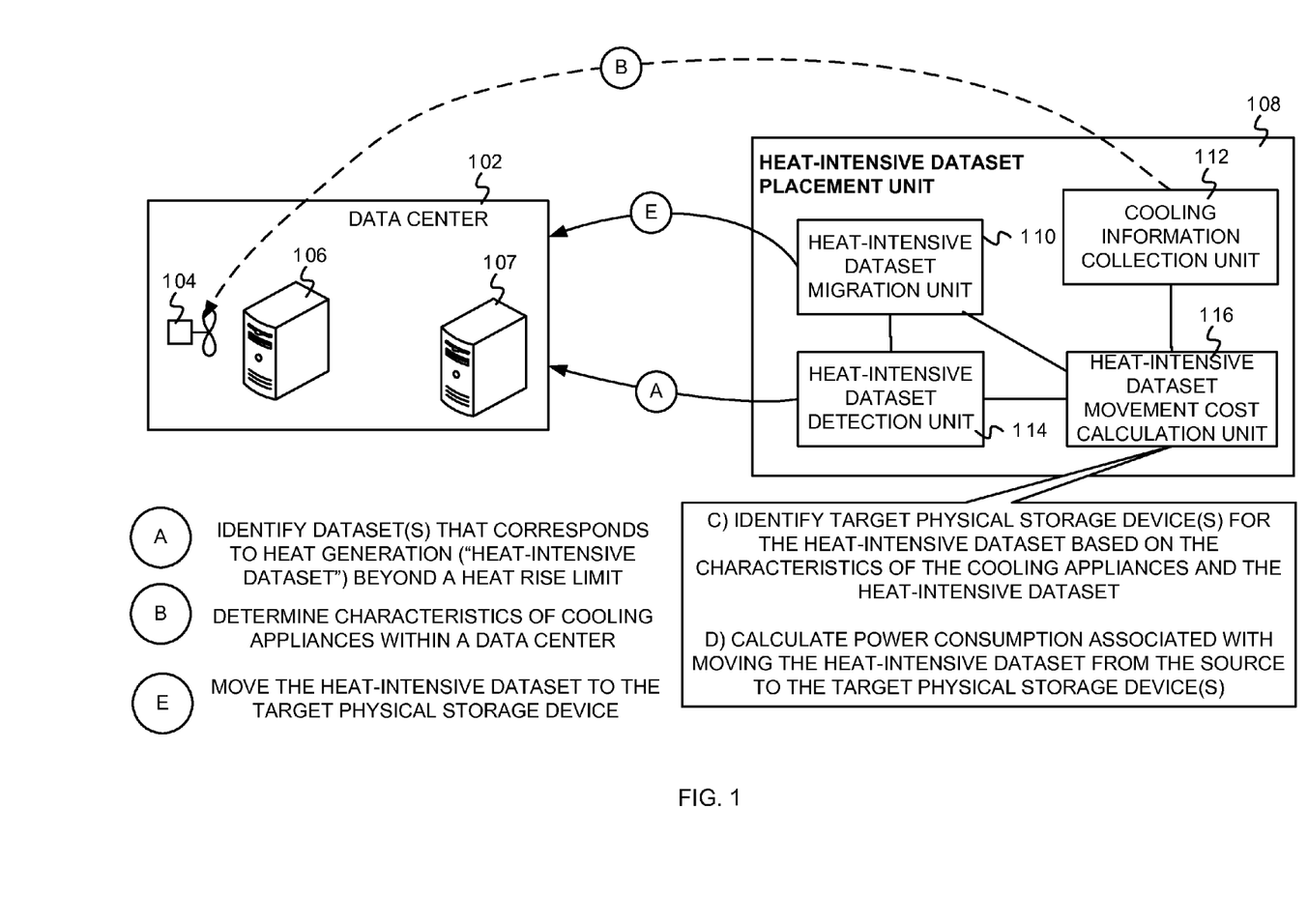
FIG. 1 is a conceptual diagram illustrating example operations for data placement based on cooling characteristics associated with cooling appliances in a data center.

FIG. 1 is a conceptual diagram illustrating example operations for data placement based on cooling characteristics associated with cooling appliances in a data center. FIG. 1 depicts a data center 102 associated with a heat-intensive dataset placement unit 108. The data center 102 comprises physical storage devices 106 and 107. The data center 102 also comprises a cooling appliance 104. The cooling appliance 104 is positioned such that the physical storage device 106 is in close proximity to the cooling appliance 104, while the physical storage device 107 is further away from the cooling appliance 104. The heat-intensive dataset placement unit 108 comprises a cooling information collection unit 112, a heat-intensive dataset detection unit 114, a heat-intensive dataset migration unit 110, and a heat-intensive dataset movement cost calculation unit 116. The heat-intensive dataset detection unit 114 is coupled with the heat-intensive dataset migration unit 110. The cooling information collection unit 112, the heat-intensive dataset detection unit 114, and the heat-intensive dataset migration unit 110 are all coupled with the heat-intensive dataset movement cost calculation unit 116.

The heat-intensive dataset placement unit 108 implements functionality to determine heat-intensive datasets based on identifying frequently accessed datasets, and/or operation-intensive datasets. The heat-intensive dataset placement unit 108 also implements functionality to move these datasets to an area of the data center 102 with a cooling factor (e.g., multiple cooling appliances cooling the area, a cooling appliance with a high cooling rating cooling the area, etc.) that can accommodate heat generated in relation to the dataset beyond a heat rise limit.

At stage A, the heat-intensive dataset detection unit 114 identifies one or more datasets that correspond to heat generation ("heat-intensive dataset") beyond a heat rise limit. In one implementation, the heat-intensive dataset detection unit 114 may identify frequently accessed dataset(s). The dataset (s) might be data elements, one or more entire database, one or more database objects, file systems, etc. The heat-intensive dataset detection unit 114 may identify the frequently accessed datasets by monitoring requested operations submitted to the data center 102. The heat-intensive dataset detection unit 114 can determine an average number of insert, update, and delete operations performed per second on the datasets. In a DB2® environment, a defined script command may be used to retrieve information about DB2 database transactions, tablespaces, table statistics, database configurations, database partitions, etc. To determine the frequently accessed datasets, the heat-intensive dataset detection unit 114 can perform two executions, separated by a defined time interval, of the defined script command on a particular dataset and average out the results to determine a number of operations performed per second on the dataset.

Additionally, in order to determine the heat-intensive dataset, the heat-intensive dataset detection unit 114 also determines source physical storage device(s) that host the dataset. The heat-intensive dataset detection unit 114 may determine database tables, file system(s), logical partition(s), etc., that comprise the dataset. The heat-intensive dataset detection unit 114 also determines one or more physical servers, hard disk drives, and physical partitions that host the dataset. The heat-intensive dataset detection unit 114 may access a mapping table to determine a mapping between physical storage device(s) and the dataset. In a DB2 environment, the heat-intensive dataset detection unit 114 may use a "db2look" command to identify physical storage devices that host the dataset. For example, the heat-intensive dataset detection unit 114 may determine that the dataset resides on the physical storage device 107. Based on knowledge of the source physical storage device (e.g., power specification of the chipset, maximum temperature of a processor, thermal metric of a motherboard, technology of the physical storage device, etc.), the heat-intensive dataset detection unit 114 calculates a heat generation associated with the dataset based on power consumption, and marks the dataset as a heat-intensive dataset if the heat generation associated with the dataset exceeds or meets a heat rise threshold.

The heat-intensive dataset detection unit 114 can also determine heat generation based on analyzing queries. The heat-intensive dataset detection unit 114 can identify and analyze queries that operate on a dataset. The heat-intensive dataset detection unit 114 can analyze the queries (e.g., by determining and analyzing access plans associated with each of the queries) that operate on the dataset to estimate at least one of a number of instructions, a number of I/O accesses, a number of buffers used, a number of table scans performed, etc. Using knowledge of the source physical storage device, the heat-intensive dataset detection unit 114 can then calculate power consumption/heat generation associated with executing each of the queries that operate on the dataset based, at least in part, on the analysis of the queries. For example, the power consumption/heat generation may be determined based on a number of instructions averaged over the number of queries per interval of time. As another example, the power consumption/heat generation may be based on an average power consumed as a result of executing the queries that operate on the dataset. The heat-intensive dataset detection unit 114 may compare the average based power consumption/heat generation with a heat rise threshold and designate the dataset as a heat-intensive dataset if the heat rise threshold is exceeded.

In some implementations, the heat-intensive dataset detection unit 114 may identify queries, within a specified time interval, that operate on the dataset, and analyze the queries received within the specified time interval to determine whether or not the dataset is a heat-intensive dataset. For example, the time interval may be selected as a six hour time interval from 10:00 am to 4:00 pm and only the queries received during this time interval may be analyzed to identify the heat-intensive datasets. In some implementations, the heat-intensive dataset detection unit 114 may analyze the queries that operate on the dataset to identify frequently received queries and only analyze the frequently received queries to determine whether or not the dataset is a heat-intensive dataset. The heat-intensive dataset detection unit 114 may determine the frequently received queries based on accessing a query log (comprising a time instant at which the query was received, a query execution time, etc.). The heat-intensive dataset detection unit 114 can determine the number of times a particular query was received in a specified time interval. The heat-intensive dataset detection unit 114 can deem the query to be a frequently received query if the number of times the query was received in the specified time interval is greater than a threshold number.

At stage B, the cooling information collection unit 112 determines characteristics of the cooling appliance 104 within the data center 102. The cooling appliance 104 can be a fan, an air conditioner, an air vent, a chilling device, etc. The cooling information collection unit 112 can determine a cooling capacity of the cooling appliance 104, a power consumption of the cooling appliance 104, a cooling efficiency of the cooling appliance 104, an amount of airflow generated by the cooling appliance 104, and other such operating characteristics and specifications of each of the cooling appliances in the data center 102.

Additionally, the cooling information collection unit 112 can also determine physical locations of cooling appliances (including the cooling appliance 104) in the data center 102. The cooling information collection unit 112 can determine location coordinates of the cooling appliances, the physical location of the cooling appliances with respect to a fixed position (e.g., an entry door in a server room), etc. In one implementation, the cooling information collection unit 112 may implement radio frequency identification (RFID) to determine the position of the cooling appliances. The cooling appliances may have RFID tags that broadcast signals either at regular intervals of time or in response to a querying signal transmitted by the cooling information collection unit 112. The cooling information collection unit 112 can receive the signal, determine a time instant at which the signal was transmitted (e.g., based on a time stamp in the signal), determine a time instant at which the signal was received, and accordingly determine the position of the cooling appliance that comprises the RFID tag. In another implementation, the cooling information collection unit 112 may access a database comprising a current position of the cooling appliances. In addition to determining the characteristics and the physical location of the cooling appliance 104 within the data center 102, the cooling information collection unit 112 can also determine a temperature of the physical storage devices 106 and 107 in the data center 102. It should be noted that although FIG. 1 depicts a single cooling appliance 104 and two physical storage devices 106 and 107, the data center 102 could comprise any suitable number of cooling appliances to cool any suitable number of physical storage devices.

At stage C, the heat-intensive dataset movement cost calculation unit 116 identifies target physical storage device(s) for the heat-intensive dataset based on the characteristics of the cooling appliances and the heat-intensive dataset. The heat-intensive dataset movement cost calculation unit 116 may identify potential target physical storage devices within cooling areas. The cooling areas may be determined such that characteristics of the cooling areas (e.g., temperature) are within a desired range or beyond a given threshold. The threshold may be selected based on a temperature rise associated with the heat-intensive dataset. Identification of the cooling areas may be influenced by the characteristics of the cooling appliances. The physical storage devices within the cooling areas may be identified as the potential target physical storage devices.

In one implementation, the heat-intensive dataset movement cost calculation unit 116 may determine the temperature rise, on the source physical storage device based on a type and technology of the source physical storage device, the frequency and voltage at which the source physical storage device operates, etc. The heat-intensive dataset movement cost calculation unit 116 can determine minimum values of cooling characteristics of the cooling appliances that can be used to cool the heat-intensive dataset. The heat-intensive dataset movement cost calculation unit 116 may rank the cooling appliances in terms of cooling efficiency and identify a subset of the cooling appliances based on the heat rise of the source physical storage device corresponding to the heat-intensive dataset. The heat-intensive dataset movement cost calculation unit 116 can then identify physical storage devices in close proximity to the subset of cooling appliances based on knowledge of the location of the physical storage devices and the cooling appliances in the data center 102. The physical storage devices in close proximity to the subset of cooling appliances may be identified as the potential target physical storage devices.

In another implementation, the heat-intensive dataset movement cost calculation unit 116 can retrieve temperature of the physical storage devices and determine the potential physical storage devices as those that have a temperature below a threshold device temperature. The heat-intensive dataset movement cost calculation unit 116 can indicate these devices as the potential target physical storage devices to the heat-intensive dataset migration unit 110.

At stage D, the heat-intensive dataset movement cost calculation unit 116 calculates a power consumption associated with moving the heat-intensive dataset from the source physical storage device(s) to the target physical storage device(s) ("target power consumption"). Based on the source power consumption, the heat-intensive dataset movement cost calculation unit 116 may also estimate a temperature rise of the target physical storage device(s) based on knowledge of the type and technology of the target physical storage device(s). The heat-intensive dataset movement cost calculation unit 116 may determine, based on comparing the target power consumption with a threshold target power consumption, to which of the potential target physical storage device(s) the heat-intensive dataset should be moved. The heat-intensive dataset movement cost calculation unit 116 may also determine, based on a current workload of the target physical storage device(s), to which of the potential target physical storage device(s) the heat-intensive dataset should be moved. For example, a potential target physical storage device may be disqualified because it is already handles a heavy workload. In the illustration, the heat-intensive dataset movement cost calculation unit 116 determines that the physical storage device 106 is in close proximity to the cooling appliance 104 and is not overloaded. Thus, the physical storage device 106 is selected as the target physical storage device.

At stage E, the heat-intensive dataset migration unit 110 drives to move the heat-intensive dataset to the determined target physical storage device. Before the heat-intensive dataset migration unit 110 moves the heat-intensive dataset to the target physical storage device, the heat-intensive dataset migration unit 110 may determine whether the heat-intensive dataset is locked. In other words, the heat-intensive dataset migration unit 110 may determine whether the heat-intensive dataset is currently being accessed (e.g., read, updated, etc.), by other applications, processes, etc. If so, the heat-intensive dataset migration unit 110 may defer moving the heat-intensive dataset to the target physical storage device, cancel the move, or request that the heat-intensive dataset movement cost calculation unit 116 select another target physical storage device. The heat-intensive dataset migration unit 110 may schedule operations for moving the heat-intensive dataset to the target physical storage device to begin at a time when the heat-intensive dataset is not heavily accessed.

Figure 2:
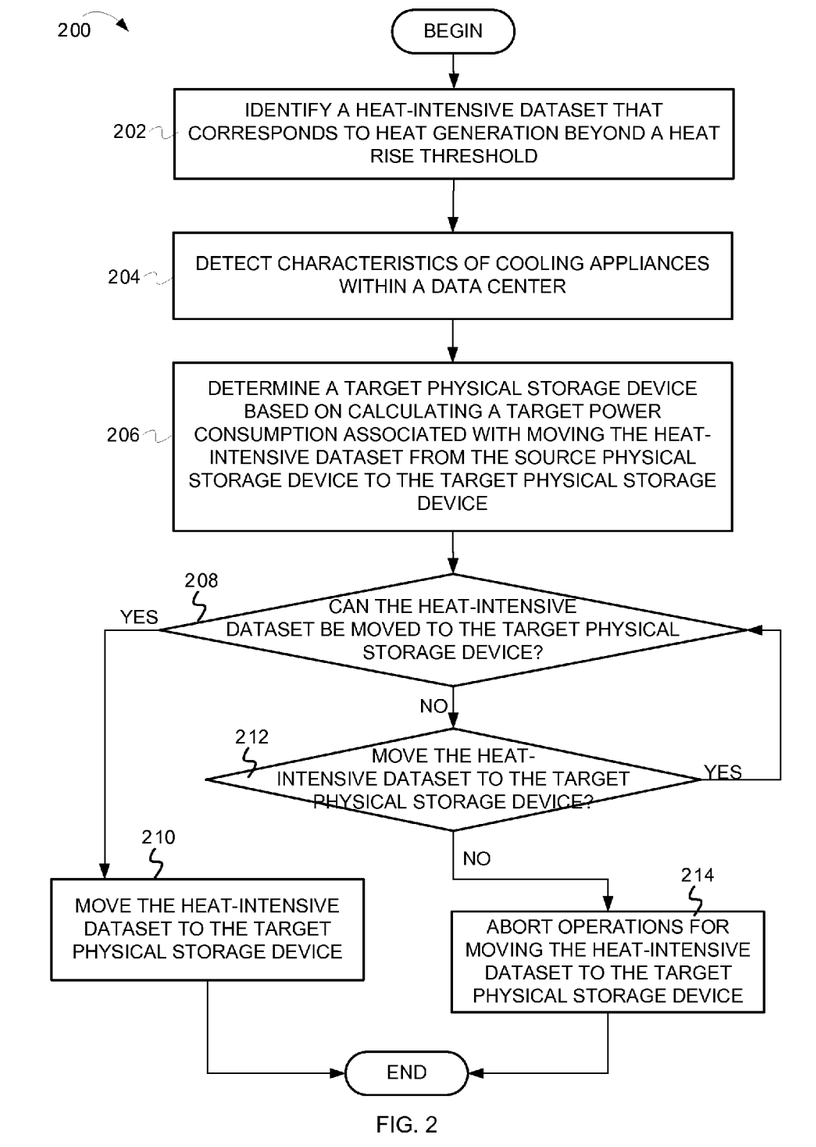
FIG. 2 is a flow diagram illustrating example operations for moving a heat-intensive dataset in a data center based on cooling appliance ratings.

FIG. 2 is a flow diagram illustrating example operations for moving heat-intensive dataset in a data center based on cooling appliance ratings. Flow 200 begins at block 202.

A heat-intensive dataset that corresponds to heat generation beyond a heat rise threshold is determined (block 202). The heat-intensive dataset can be determined by identifying highly accessed datasets. The heat-intensive dataset may also be determined based on identifying computationally intensive queries, identifying datasets on which the computationally intensive queries operate, and indicating such datasets as heat-intensive datasets. Additionally, a source physical storage device that hosts the heat-intensive dataset is also identified. A dataset can be marked as a heat intensive dataset based on knowledge of the source physical storage device. For example, after the highly accessed datasets are identified, a power consumption associated with the highly accessed dataset may be calculated for the source physical storage device. Based on the power consumption, a heat generation/temperature rise associated with the dataset may be determined. The highly accessed dataset may be deemed to be a heat-intensive dataset if the power consumption associated with the highly accessed dataset is greater than a threshold power consumption and/or if the temperature rise associated with the dataset exceeds the heat rise threshold. Operations for determining the heat-intensive dataset based on determining the source physical storage device and based on evaluating access plans associated with data queries is further described with reference to FIG. 3. The flow continues at block 204.

Characteristics of cooling appliances within a data center are determined (block 204). Examples of cooling appliances that may be used to dissipate heat generated by the physical storage devices in the data center can comprise fans, air conditioners, air vents, etc. Operating characteristics of the cooling appliances can comprise a cooling capacity of the cooling appliances, a cooling efficiency of the cooling appliances, and a power rating of the cooling appliances. In addition, a physical location of the cooling appliances in the data center can also be determined. The physical location of the cooling appliances may be determined using RFID techniques, by accessing a database comprising the physical locations and the operating characteristics of the cooling appliances, etc. The flow continues at block 206.

A target physical storage device is determined based on calculating a target power consumption associated with moving the heat-intensive dataset from the source physical storage device to the target physical storage device (block 206). The target physical storage device indicates the physical storage device to which the heat-intensive dataset should be moved. A subset of the physical storage devices in the data center may be identified as potential target physical storage devices based on the cooling characteristics of the cooling appliances, a distance between the physical storage devices and the most efficient/high rated cooling appliances, a temperature of the physical storage devices, a current power consumption of the physical storage devices, etc. The potential target physical storage devices may be further analyzed to determine the target physical storage device as a most appropriate of the potential target physical storage devices to which the heat-intensive dataset should be moved. The target power consumption associated with moving the heat-intensive dataset from the source physical storage device to each of potential target physical storage devices may be determined and the potential target physical storage device with the lowest associated target power consumption may be selected as the target physical storage device. In determining the cost of moving the heat-intensive dataset, an estimate of temperature rise in the potential target physical storage devices, a current and a projected increase in power consumption of the potential target physical storage devices, a current workload of the potential target physical storage devices, etc. may be determined. In some implementations, a temperature rise/heat generation for the potential target physical storage devices may be determined based on the target power consumption. The temperature rise/heat generation for the potential target physical storage devices may be compared and the potential target physical storage device with the lowest associated temperature rise/heat generation may be selected as the target physical storage device. Operations for determining the target physical storage device will further described with reference to FIG. 5. The flow continues at bock 208.

It is determined whether the heat-intensive dataset can be moved to the target physical storage device (block 208). In determining whether the heat-intensive dataset should be moved, it might be determined whether the heat-intensive dataset is currently in use by another process (e.g., is locked by another process). A process trying to perform read/write operations (e.g., in response to user-initiated queries, etc.) or maintenance operations (e.g., backup operations, REORG operations, etc.) on the heat-intensive dataset may also result in a lock on the heat-intensive dataset. In some implementations, the heat-intensive dataset may be moved only after the lock on the heat-intensive dataset is removed and no queries are being directed to the heat-intensive dataset.

In some implementations, data subsets of the heat-intensive dataset that are not currently being accessed may be moved. For example, a car sales database table comprising car sales information for four quarters in a current year may be deemed to be a heat-intensive dataset. The target physical storage device to which the car sales database table should be moved may also be determined. When determining whether or not to move the heat-intensive dataset, it may be determine that a data subset associated with a fourth quarter is currently being accessed and is therefore locked, while data subsets associated with a first, second, and third quarters are not currently being accessed. In such a scenario, the data subsets associated with the first, second, and third quarters may be moved to the target physical storage device. After the lock on the data subset associated with the fourth quarter is released, the data subset may be moved to the target physical storage device. In another implementation, an event log may be analyzed to determine an average rate at which queries directed to the heat-intensive dataset are received and to determine a time interval where the probability to receiving queries directed to the heat-intensive dataset is low. Operations for moving the heat-intensive dataset to the target physical storage device may be scheduled so that the operations for moving the heat-intensive dataset are initiated at a time when there are a few or no queries directed to the heat-intensive dataset. If it is determined that the heat-intensive dataset can be moved to the target physical storage device, the flow continues at block 210. Otherwise, the flow continues at block 212.

It is determined whether the heat intensive dataset should be moved to the target physical storage device (block 212). The flow 200 moves from block 208 to block 212 if it is determined that the heat-intensive dataset cannot be moved to the target physical storage device. For example, it may be determined that the heat-intensive dataset cannot be moved to the target physical storage device if the heat-intensive dataset is currently being accessed by another application. If it is determined that the heat intensive dataset should still be moved to the target physical storage device, the flow continues at block 208, where it is determined whether the heat-intensive dataset can be moved to the target physical storage device. Otherwise, the flow continues at block 214.

Operations for moving the heat-intensive dataset to the target physical storage device are aborted (block 214). The flow 200 moves from block 212 to block 214 if it is determined that the heat intensive dataset should not be moved to the target physical storage device. From block 214, the flow ends.

The heat-intensive dataset is moved to the target physical storage device (block 210). The flow 200 moves from block 208 to block 210 if it is determined that the heat-intensive dataset can be moved to the target physical storage device. As part of operations for moving the heat-intensive dataset, extents that comprise the heat-intensive dataset may be physically moved from the source physical storage device to the target physical storage device. Moreover, an internal tablespace map that indicates conversions from locations of the heat-intensive dataset on logical page(s) to locations on physical page(s) may be updated to indicate a new location of the heat-intensive dataset on the target physical storage device.

The heat-intensive dataset on the source physical storage device may be locked before the heat-intensive dataset is moved to the target physical storage device. The heat-intensive dataset on the source physical storage device may be replicated on the target physical storage device and may then be removed from the source physical storage device. In some implementations, the heat-intensive dataset may or may not be locked based on locking policies associated with the heat-intensive dataset. The locking policies may indicate whether the heat-intensive dataset should be locked and if so, how requests to access the locked dataset should be handled. For example, the lock on the heat-intensive dataset may be a read-only lock (e.g., that allows queries to read but not modify the heat-intensive dataset) or a lock that denies any form of access to the heat-intensive dataset. In some implementations, if a query directed to the heat-intensive dataset is received while the heat-intensive dataset is being moved from the source physical storage device to the target physical storage device, the operations for moving the heat-intensive dataset may be aborted, the lock on the heat-intensive dataset may be removed, and access to the heat-intensive dataset may be permitted. The operations for moving the heat-intensive dataset to the target physical storage device may be attempted at a later time (e.g., after a pre-determined interval of time). In another implementation, if the query directed to the heat-intensive dataset is received while the heat-intensive dataset is being moved, the query may be stored (e.g., in a pending query queue) and may be redirected to the target physical storage device once the operations for moving the heat-intensive dataset are completed. In another implementation, if the query directed to the heat-intensive dataset is received while the heat-intensive dataset is being moved, the query may be blocked and a "query failed" notification may be transmitted to an application that initiated the query. The application that initiated the query may be required to retransmit the query at a later time. From block 210, the flow ends.

Figure 3:
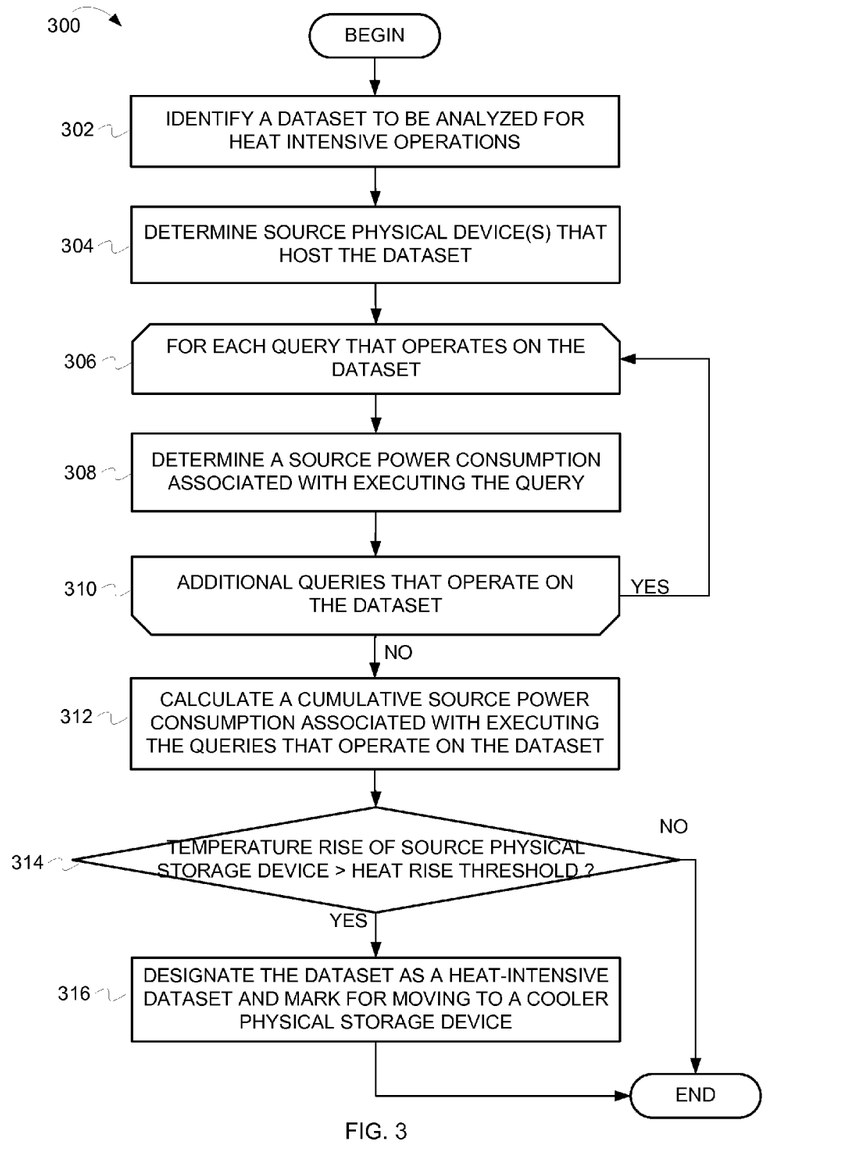
FIG. 3 is a flow diagram illustrating example operations for identifying heat-intensive data based on evaluating access plans associated with queries directed to the heat-intensive data.

FIG. 3 is a flow diagram illustrating example operations for identifying heat-intensive data based on evaluating access plans associated with queries directed to the heat-intensive data. Flow 300 begins at block 302.

A dataset to be analyzed for heat-intensive operations is identified (block 302). As one example, the dataset to be analyzed may be determined based on determining frequently accessed datasets by monitoring requested operations submitted to a data center (as described with reference to stage A of FIG. 1). As another example, the dataset to be analyzed may be determined based on determining frequently received queries and identifying the dataset on which the frequently received queries operate. As another example, each dataset (e.g., a table, a database, etc.) stored on physical storage devices in the data center may be analyzed. The flow continues at block 304.

Source physical device(s) that host the dataset are identified (block 304). Database tables, file systems, extents, containers, logical partitions, etc. that comprise the dataset may be determined. Next, the physical storage device such as, a hard disk drive, a server, a partition on the hard disk drive or server, etc. that hosts the dataset may be determined. A network address (e.g., an Internet Protocol (IP) address), a name, a device identifier, etc. of the source physical storage device may also be determined. The flow continues at block 306.

A loop begins for each query that operates on the dataset (block 306). The loop is begun to perform loop operations described with reference to block 308 on each of the queries to determine computationally intensive queries that operate on the dataset. In one implementation, queries received within a specified time interval may be analyzed in accordance with loop operations described in block 308. In another implementation, frequently received/executed queries directed to the dataset may be determined and may be analyzed in accordance with the loop operations described in block 308. In some implementations, an access plan associated with each received query may be analyzed to determine the queries that operate on the dataset and a temporary log of the queries that operate on the dataset may be created, prior to initiating the loop beginning at block 306. The flow continues at block 308.

Figure 4:
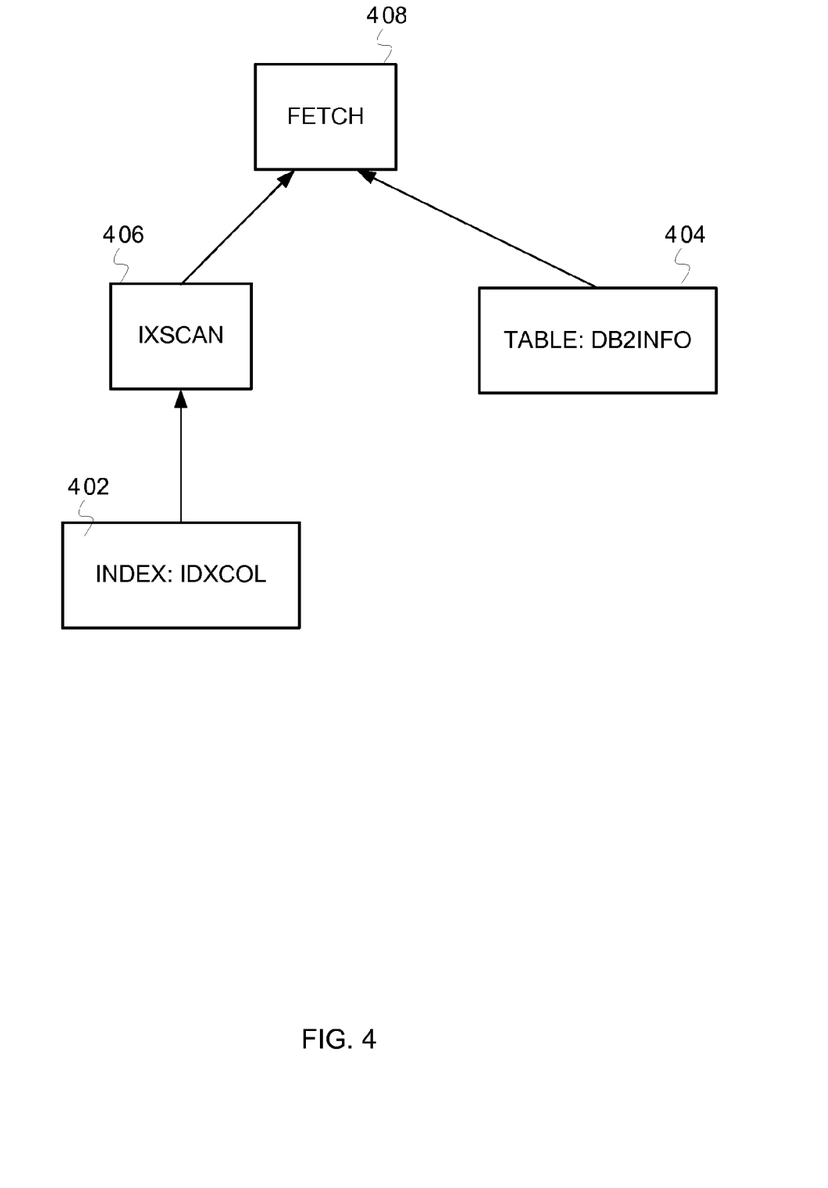
FIG. 4 illustrates a part of an example access plan for executing a query.

A power consumption of the source physical storage device ("source power consumption") associated with executing the query is determined (block 308). The query, when received, is decomposed into a sequence of operations (e.g., fetch, read, write operations) that a processor performs in order to execute the query and generate a desired output. This sequence of operations may collectively be referred to an access plan or an access path of the query. The access plan associated with the query can be analyzed to determine the sequence of operations associated with executing the query, resources (e.g., memory, CPU, I/O, etc.) consumed as a result of executing the query, a number of table scans performed in executing the query, and other performance parameters associated with executing the query. In a DB2 environment, the access plan can be analyzed using a "db2exfmt" tool by providing the query as one of the inputs to the "db2exfmt" tool. FIG. 4 illustrates a part of an example access plan for executing "db2exfmt" to analyze a query. In the FIG. 4, an index IDXCOL node 402 is connected to an IXSCAN node 406. The IXSCAN node 406 and a table DB2INFO node 404 are connected to a fetch node 408. As depicted in the FIG. 4, DB2 performs an index access of the IDXCOL index 402 to select data from the DB2INFO table 404. Referring back to FIG. 3, analysis of the access plan can also yield the dataset querying cost including a computational cost associated with executing the query, a CPU cost (e.g., a number of instructions performed in executing the query), an I/O cost, etc. Statistics for tables, indexes, columns, etc., properties for operators, tablespace statistics, optimization parameters, etc., may also be determined.

Based on the analysis of the access plan associated with the query, the source power consumption associated with executing the query can be calculated. For example, the source power consumption may be estimated based on knowledge of the sequence of operations associated with executing the query and a source physical storage device (e.g., type and technology of the source physical storage device). An average source power consumption during user operations (e.g., read operations, write operations) can be determined by determining the power consumption of the source physical storage device in various modes such as idle, data transfer (e.g., advanced technology attachment (ATA) or small computer system interface (SCSI) bus transfer), read, write, seek, quiet seek, start, etc. The average source power consumption during typical user operations ($P_{typ}$) may be determined using Eq. 1, wherein Idle, Write, and Read denote the source power consumption in the corresponding modes. The multipliers for each of the modes (i.e., 90%, 2.5%, and 7.5% respectively for the Idle, Write, and Read modes respectively) denote a percentage of the time the source physical storage device in this corresponding mode. As depicted in Eq. 1, it is assumed that the read and the write operations comprise 10% of the total time the source physical storage device is in use.

$$P_{typ} = \frac{\{(Idle * 90) + (Write * 2.5) + (Read * 7.5)\}}{100} \quad \text{Eq. 1}$$

In other implementations, however, any suitable percentage for idle, read, and write may be input into Eq. 1 based on analysis of event logs, access plans, etc. to determine time intervals for which the source physical storage device is in idle mode, read mode, and write mode. A different equation may be used to estimate average source power consumption during intensive operations (e.g., defragmenting the physical storage device, scanning the surface, copying files, virus checks, etc.). The average source power consumption during the intensive operations ($P_{max}$) can be determined using Eq. 2.

$$P_{max} = \frac{\{Write + Seek + (Read * 3)\}}{5} \quad \text{Eqn. 2}$$

The source power consumption can be used to determine whether the query is a computationally intensive query. For example, the source power consumption associated with executing the query may be compared against a threshold source power consumption. The query may be deemed to be a computationally intensive query if the source power consumption associated with executing the query is greater than the threshold source power consumption. The source power consumption can also be used to calculate a heat generation or a temperature rise, associated with executing the query, of the source physical storage device. The query may be deemed to be a computationally intensive query and the dataset may be marked as a heat-intensive dataset if the heat generation associated with executing the query exceeds or meets a heat rise threshold. The flow continues at block 310.

It is determined whether there exist additional queries operate on the dataset (block 310). The temporary log, determined at block 306, may be used to keep track of the queries that operate on the dataset. If it is determined that there exist additional queries that operate on the dataset, the flow loops back to block 306 where a next query that operates on the dataset is identified, an access plan for the query is determined, and a source power consumption associated with executing the query is determined. If it is determined that there do not exist additional queries that operate on the dataset, the loop beginning at block 306 ends and the flow continues at block 312.

A cumulative source power consumption associated with executing the queries that operate on the dataset is determined (block 312). The cumulative source power consumption determined based on the source power consumption associated with executing each of the queries that operate on the dataset (described with reference to Eq. 1 and Eq. 2). Additionally, a temperature rise associated with the source physical storage devices can be calculated (or determined from a look up table) based on knowledge of the type and technology of the source physical storage devices, the cumulative source power consumption, etc. The flow continues at block 314.

It is determined whether the temperature rise associated with the source physical storage device is greater than a heat rise threshold (block 314). In determining whether the temperature rise associated with the source physical storage device is greater than the heat rise threshold, it may be determined whether the dataset is frequently accessed, whether computationally intensive queries are directed to the dataset, etc. The heat rise threshold may be indicated as a percentage of the source physical storage device's maximum operating temperature. For example, the heat rise threshold may be 70% of the maximum operating temperature, indicating that any increase in temperature associated with the dataset should not cause the temperature of the physical storage device to exceed the heat rise threshold (e.g., 70% of the maximum operating temperature). Alternately, the heat rise threshold may be indicated as a difference between previous and current temperature values. For example, the heat rise threshold may be 4° C., indicating that the dataset on the physical storage device should not be associated with a temperature increase that is greater than the heat rise threshold (e.g., 4° C.). The heat rise threshold may be determined based on knowledge of an optimal operating temperature of the physical storage device, a maximum number of CPU instructions that should be directed to the dataset per second so as not to result in an increase in temperature of the source physical storage device, etc. In some implementations, the cumulative source power consumption may be compared with a threshold source power consumption to determine whether or not the dataset is a heat-intensive dataset. If it is determined that the temperature rise associated with the source physical storage device is greater than a heat rise threshold, the flow continues at block 316. Otherwise, the flow ends.

The dataset is designated as a heat-intensive dataset and is marked for moving to a cooler physical storage device (block 316). From block 316, the flow ends.

Figure 5:
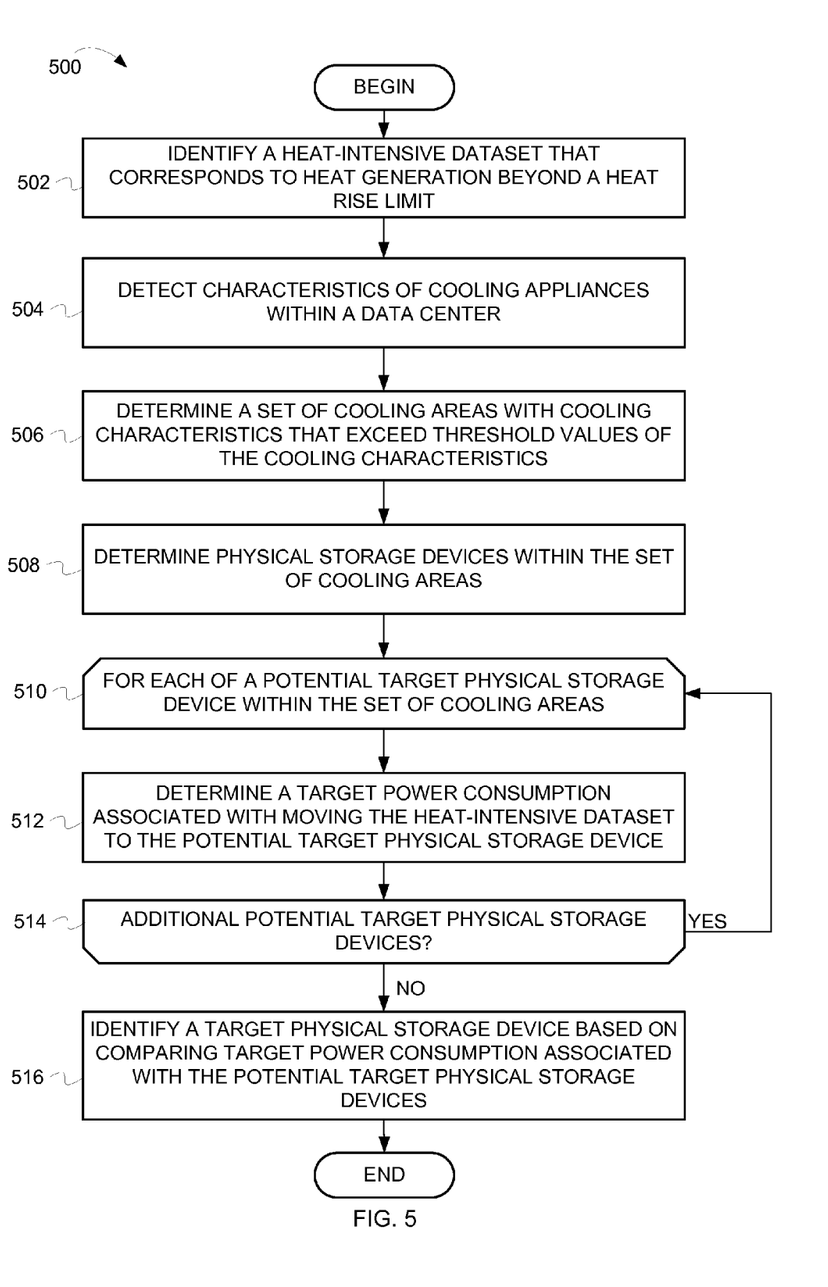
FIG. 5 is a flow diagram illustrating example operations for determining a target physical storage device to which a heat-intensive dataset should be moved.

FIG. 5 is a flow diagram illustrating example operations for determining a target physical storage device to which heat-intensive dataset should be moved. Flow 500 begins at block 502.

A heat-intensive dataset that corresponds to heat generation beyond a heat rise limit is identified (block 502). As described with reference to flow 300 of FIG. 3, the heat-intensive dataset can be determined by determining frequently accessed datasets, identifying computationally intensive queries that operate on the datasets, comparing a heat generation, of the source physical storage system, associated with executing queries directed to the dataset with a heat rise threshold, etc. The flow continues at block 504.

Characteristics of cooling appliances within a data center are determined (block 504). As described above, a cooling capacity of the cooling appliances, a cooling efficiency of the cooling appliances, a power consumption of the cooling appliances, a physical location of the cooling appliances, etc. may be determined. The flow continues at block 506.

A set of cooling areas with cooling characteristics that exceed threshold values of the cooling characteristics are determined (block 506). Temperature sensors maybe used to determine the set of cooling areas. The set of cooling areas may be determined based on cooling characteristics of the cooling appliances, a temperature rise associated with the heat-intensive dataset, a power consumption associated with the heat-intensive dataset (described with reference to block 312), etc. For example, a lookup table comprising values of temperature rise and corresponding threshold values of the cooling characteristics may be accessed. As an example, if it is determined that the temperature rise associated with the heat-intensive dataset is 5° C., the lookup table may be accessed to determine that the temperature of the cooling area should be no greater than 10° C. below an average ambient temperature of the data center. In addition, the cooling appliances that produce the set of cooling areas may also be determined based on knowledge of the physical location of the cooling appliances. This can ensure that the most effective cooling appliances are selected to cool datasets that cause the most heat dissipation. The flow continues at block 508.

Physical storage devices within the set of cooling areas are determined (block 508). The physical storage devices within the set of cooling areas may be determined, based on knowledge of a physical location of the cooling appliances and physical location of the physical storage devices in the data center. The physical storage devices within the set of cooling areas may be designated as potential target physical storage devices and an IP address or other suitable device identifier of each of the potential target physical storage devices may be determined.

In some implementations, however, the cooling appliances may be ranked in order of cooling efficiency, cooling capacity, etc. The temperature rise associated with the heat-intensive dataset may be compared against a series of temperature thresholds and each threshold may be associated with a different range of cooling characteristics of the cooling appliances. For example, if the temperature rise associated with the heat-intensive dataset falls between a low and a medium temperature rise threshold, a first set of cooling appliances with low cooling efficiencies may be selected. As another example, if the temperature rise associated with the heat-intensive dataset exceeds a high threshold, a second set of cooling appliances with the highest cooling efficiencies may be selected. The potential target physical storage devices may be selected as physical storage devices that are within a threshold distance of the selected set of cooling appliances. The flow continues at block 510.

A loop begins to perform a set of operations (described in block 512) on each of the potential target physical storage devices (block 510). For each potential target physical storage device, a target power consumption associated with moving the heat-intensive dataset to the potential target physical storage device is determined in order to determine an appropriate target physical storage device to which the heat-intensive dataset should be moved. The flow continues at block 512.

A target power consumption associated with moving the heat-intensive dataset to the potential target physical storage device is determined (block 512). An average power consumption of the potential target physical storage device during user operations (determined in Eq. 1) and during intensive operations (determined in Eq. 2) may be calculated for the queries associated with the heat-intensive dataset. An estimate of the increase in target power consumption of the potential target physical storage devices, in response to moving the heat-intensive dataset to the potential target physical storage device, may be determined. In addition, a current workload of the potential target physical storage device may be taken into consideration to calculate an estimate of the workload after the heat-intensive dataset is moved to the potential target physical storage device, and to determine whether the potential target physical storage device is capable of handling the increase in workload. The target power consumption may be used to determine an estimate for temperature rise of the potential target physical storage device. Based on knowledge of the type and technology of the potential target physical storage device, the temperature rise can be determined (e.g., by accessing a look up table). The flow continues at block 514.

It is determined whether there exist additional potential target physical storage devices (block 514). If it is determined that there exist additional potential target physical storage devices to be evaluated, the flow loops back to block 510, where a next potential target physical storage device is identified and a target power consumption associated with moving the heat-intensive dataset to the next potential target physical storage device is determined. If it is determined that there do not exist additional potential target physical storage devices to be evaluated, the loop beginning at block 510 ends, and the flow continues at block 516.

A target physical system is identified based on comparing target power consumption associated with each of the potential target physical storage devices (block 516). For example, the potential target physical storage device with the lowest target power consumption associated with moving the heat-intensive dataset may be selected as the target physical storage device. As another example, the potential target physical storage device with the lowest temperature rise associated with moving the heat-intensive dataset may be selected as the target physical storage device. From block 516, the flow ends.

It should be noted that the operations described in the flow diagrams are examples meant to aid in understanding embodiments, and should not be used to limit embodiments or limit scope of the claims. Embodiments may perform additional operations, fewer operations, operations in a different order, operations in parallel, and some operations differently. For example, in some implementations, after it is determined that the temperature rise associated with the source physical storage device is not greater than the heat rise threshold (block 314 of FIG. 3), it may be determined whether the dataset should be moved to a physical storage device being cooled by a cooling appliance with a lower cooling capacity (or a lower power rating). For example, it may be determined that the dataset is currently on a physical storage device being cooled by a cooling appliance with a highest cooling capacity. Based on knowledge that the dataset is not frequently accessed and/or queries directed to the dataset are not computationally intensive and do not correspond to heat generation beyond the heat rise threshold, it may be determined that the dataset should be moved to a physical storage device being cooled by the cooling appliance with the lower cooling capacity.

Also, FIG. 3 describes identifying the heat-intensive dataset in response to analyzing queries that operate on the dataset, determining a source power consumption associated with executing the queries, etc. However, in other implementations, a temperature (or power consumption) of each of the physical storage devices may be monitored. If the temperature (or the power consumption) of a physical storage device increases beyond a threshold, datasets hosted by the physical storage device may be identified and queries directed to the datasets may be analyzed to identify heat-intensive datasets.

Figure 6:
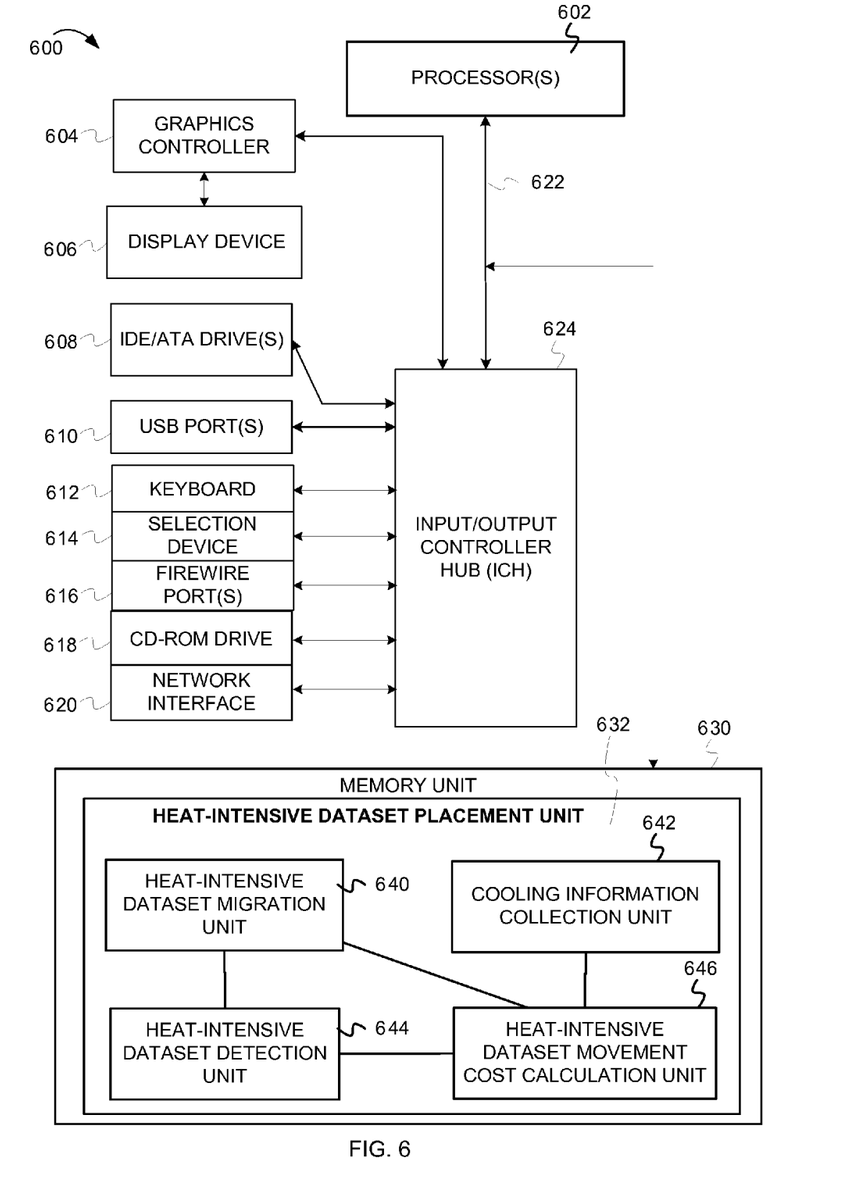
FIG. 6 is an example block diagram of a computer system configured for identifying and moving a heat-intensive dataset based on characteristics of cooling appliances.

FIG. 6 is an example block diagram of a computer system 600 configured for identifying and moving heat-intensive datasets based on characteristics of cooling appliances. The computer system 600 includes a processor 602. The processor 602 is connected to an input/output controller hub 624 (ICH), also known as a south bridge, via a bus 622 (e.g., PCI, ISA, PCI-Express, HyperTransport, etc). A memory unit 630 interfaces with the processor 602 and the ICH 624. The main memory unit 630 can include any suitable random access memory (RAM), such as static RAM, dynamic RAM, synchronous dynamic RAM, extended data output RAM, etc.

The memory unit 630 comprises a heat-intensive dataset placement unit 632. The heat-intensive dataset placement unit 632 comprises a heat-intensive dataset migration unit 640, a cooling information collection unit 642, a heat-intensive dataset detection unit 644, and heat-intensive dataset movement cost calculation unit 646. The data migration unit 640, the cooling information collection unit 642, and the heat-intensive dataset detection unit 644 are coupled with the heat-intensive dataset movement cost calculation unit 646. Also, the heat-intensive dataset migration unit 640 is coupled with the heat-intensive dataset detection unit 644. The heat-intensive dataset placement unit 632 embodies functionality to identify heat-intensive datasets in a data center and accordingly move the heat-intensive datasets to cooler areas in the data center based on cooling ratings associated with cooling appliances in the data center as described with reference to FIGS. 1-5.

The ICH 624 connects and controls peripheral devices. In FIG. 6, the ICH 624 is connected to IDE/ATA drives 608 (used to connect external storage devices) and to universal serial bus (USB) ports 610. The ICH 624 may also be connected to a keyboard 612, a selection device 614, firewire ports 616, CD-ROM drive 618, and a network interface 620. The ICH 624 can also be connected to a graphics controller 604. The graphics controller is connected to a display device 606 (e.g., monitor). In some embodiments, the computer system 600 can include additional devices and/or more than one of each component shown in FIG. 6 (e.g., video cards, audio cards, peripheral devices, etc.). For example, in some instances, the computer system 600 may include multiple processors, multiple cores, multiple external CPU's. In other instances, components may be integrated or subdivided.

FIGS. 1-6 describe implementations, wherein the heat-intensive dataset placement unit 108 performs operations for identifying and moving heat-intensive datasets, based on cooling characteristics of cooling appliances, from one physical storage device to another within a data center. However, in some implementations, the heat-intensive dataset may be moved to physical storage devices across multiple data centers. Source physical storage device(s) and target physical storage device(s) of the heat-intensive dataset may be located in different data centers. Moreover, the data centers that house the source physical storage device(s) and target physical storage device(s) may be in different geographic locations. Some of the operations described with reference to FIGS. 1-6 may be performed at individual data centers, while some of the operations might be offloaded to a centralized server that manages the data centers. Operations for migration of heat-intensive datasets across a network of data centers are further described with reference in FIG. 7.

Figure 7:
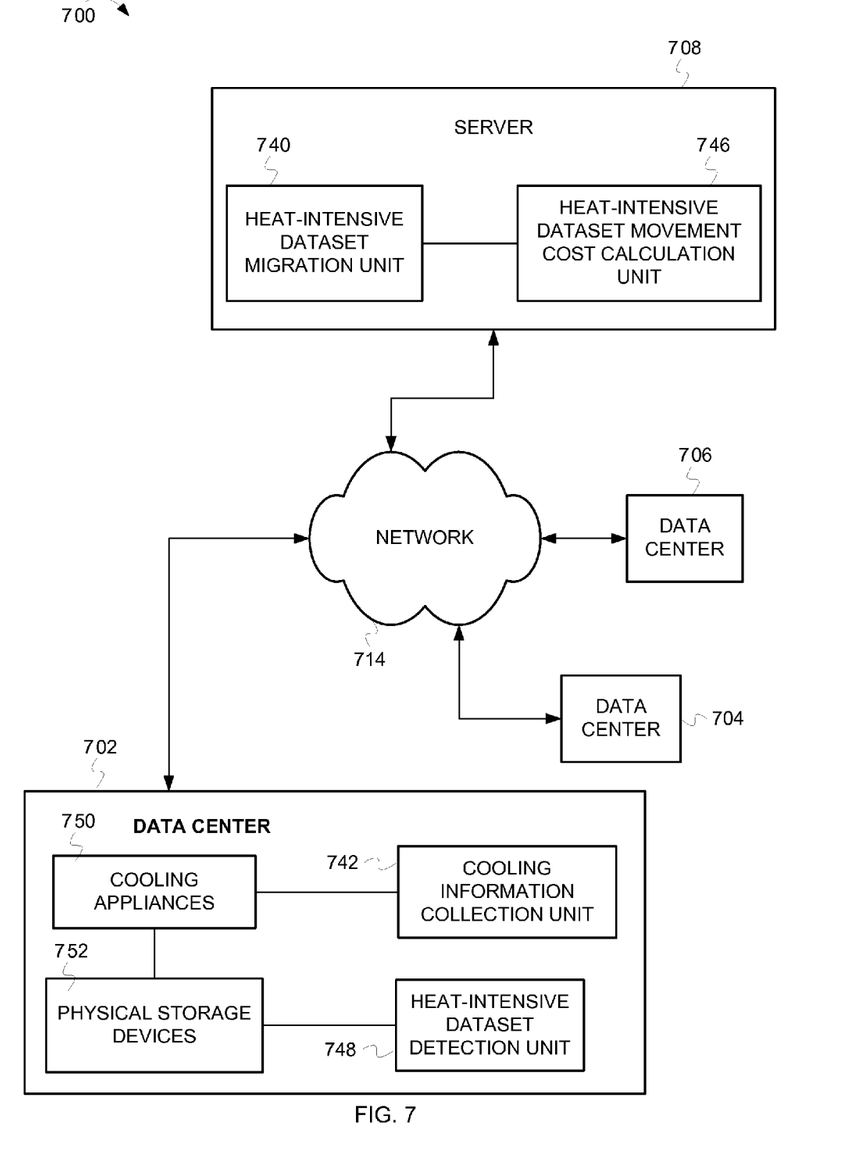
FIG. 7 is an example block diagram configured for identifying and moving a heat-intensive dataset across a network of data centers.

FIG. 7 is an example block diagram configured for identifying and moving a heat-intensive dataset across a network of data centers. The system 700 comprises data centers 702, 704, and 706 and a server 708. The data center 702 comprises physical storage devices 752, cooling appliances 750, a cooling information collection unit 742, and a heat-intensive dataset detection unit 748. The cooling appliances 750 are strategically placed throughout the data center 702 so that the cooling appliances 750 cool the physical storage devices 752. The cooling information collection unit 742 monitors and collects information about the cooling appliances 750. The heat-intensive dataset detection unit 748 monitors the physical storage devices 752 and identifies heat-intensive datasets stored on the physical storage devices 752. The server 708 comprises a heat-intensive dataset migration unit 740 and a heat-intensive dataset movement cost calculation unit 746. The heat-intensive dataset migration unit 740 is coupled with the heat-intensive dataset movement cost calculation unit 746.

In the data center 702, the cooling information collection unit 742 determines a physical location and cooling characteristics of the cooling appliances 750. The cooling information collection unit 742 may also indicate the physical storage devices 752 that are cooled by each of the cooling appliances 752. The heat-intensive dataset detection unit 748 identifies datasets that result in generation of at least a threshold amount of heat. The heat-intensive dataset detection unit 748 can determine the heat-intensive dataset sets based on identifying frequently accessed datasets, identifying queries frequently directed to datasets, determining a power consumption/heat generation associated with executing the queries, and accordingly identifying datasets that result in a generation of at least the threshold amount of heat. The heat-intensive dataset detection unit 748 may also determine a source physical storage device that hosts the heat-intensive dataset.

On the server 708, the heat-intensive dataset movement cost calculation unit 746 may receive an indication of the heat-intensive dataset and a source physical storage device from the heat-intensive dataset detection unit 748. The heat-intensive dataset movement cost calculation unit 746 may also receive information about physical location and cooling characteristics of the cooling appliances 750 from the cooling information collection units 742 in each of the data centers 702, 704, and 706. The heat-intensive dataset movement cost calculation unit 746 can then determine, across the data centers 702, 704, and 706, potential target physical storage devices, a target power consumption associated with the heat-intensive dataset from the source physical storage device to each of the potential target physical storage devices, and determine the target physical storage devices as one of the potential target physical storage devices with the least target power consumption associated with moving the heat-intensive dataset. The heat-intensive dataset migration unit 740 can then move the heat-intensive dataset to the target physical storage device.

The data centers 702, 704, and 706 and the server 708 communicate via a communication network 714. The communication network 714 can include any technology (e.g., Ethernet, IEEE 802.11n, SONET, etc) suitable for passing communication between the data centers 702, 704, and 706 and the server 708. Moreover, the communication network 714 can be part of other networks, such as cellular telephone networks, public-switched telephone networks (PSTN), cable television networks, etc. Additionally, the data centers 702, 704, and 706 and the server 708 can be any suitable devices capable of executing software in accordance with the embodiments described herein.

Embodiments may take the form of a hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable storage medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other machine-readable communications medium. A machine-readable storage medium does not include transitory, propagating signals.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

While the embodiments are described with reference to various implementations and exploitations, it will be understood that these embodiments are illustrative and that the scope of the inventive subject matter is not limited to them. In general, techniques for heat-intensive data placement as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
determining that execution of one or more data queries might result in heat generation in excess of a heat rise limit at a source storage device, wherein the one or more data queries are associated with a dataset, wherein the source storage device hosts the dataset, wherein the source storage device is associated with a first cooling area of a plurality of cooling areas, wherein said determining that the execution of the one or more data queries might result in heat generation in excess of the heat rise limit at the source storage device comprises:
  determining that the one or more data queries operate on the dataset;
  determining one or more access plans that correspond to the one or more data queries;
  computing an overall power consumption of the one or more access plans; and
  determining that the overall power consumption exceeds a power consumption threshold;
selecting a second cooling area of the plurality of cooling areas of one or more data centers to accommodate the heat generation based, at least in part, on cooling characteristics of a plurality of cooling appliances of the plurality of cooling areas, wherein each cooling area of the plurality of cooling areas is serviced by a set of one or more cooling appliances of the plurality of cooling appliances;
determining a target storage device associated with the second cooling area; and
moving the dataset from the source storage device to the target storage device.

2. The method of claim 1, wherein the cooling characteristics of the plurality of cooling appliances comprise at least one of a physical location of each of the plurality of cooling appliances, a cooling efficiency of the each of the plurality of cooling appliances, a power consumption of the each of the plurality of cooling appliances, a cooling capacity of the each of the plurality of cooling appliances, and an amount of airflow generated by the each of the plurality of cooling appliances.

3. The method of claim 1, wherein said determining that the execution of the one or more data queries might result in heat generation in excess of the heat rise limit at the source storage device comprises:
determining that the one or more data queries operate on a plurality of datasets which comprise the dataset; and
determining that a number of a subset of the data queries that operate on the dataset exceeds a threshold number of data queries.

4. The method of claim 1, wherein said determining that the execution of the one or more data queries might result in heat generation in excess of the heat rise limit at the source storage device comprises:
determining that the source storage device hosts the dataset; and
determining a device identifier of the source storage device.

5. The method of claim 1, wherein said determining the target storage device associated with the second cooling area comprises:
identifying a plurality of potential target storage devices associated with the plurality of cooling areas, wherein the plurality of potential target storage devices include the target storage device; and
determining power consumptions associated with moving the dataset from the source storage device to each of the plurality of potential target storage devices, wherein the target storage device has a lowest of the power consumptions.

6. The method of claim 5, wherein said determining power consumptions associated with moving the dataset from the source storage device to each of the plurality of potential target storage devices further comprises:
for each of the potential target storage devices,
  determining a temperature rise at the potential target storage device based, at least in part, on the power consumption associated with moving the heat-intensive dataset from the source storage device to the potential target storage device.

7. The method of claim 1, wherein said moving the dataset from the source storage device to the target storage device comprises:
determining that the dataset is not locked.

8. The method of claim 1 further comprising:
determining that the dataset is locked; and
scheduling said moving the dataset to a time when the dataset is expected not to be locked.

9. The method of claim 8, wherein said scheduling said moving the dataset to the time when the dataset is expected not to be locked comprises:
analyzing an event log with respect to the dataset; and
identifying when the dataset is accessed below a threshold access frequency.

10. The method of claim 1, wherein said moving the dataset from the source storage device to the target storage device comprises locking the dataset during said moving.

11. The method of claim 10, further comprising:
detecting a request associated with the dataset; and
based on the request, performing one of:
aborting said moving the dataset from the source storage device to the target storage device,
preventing servicing of the request, and
allowing restricted access to the dataset based, at least in part, on the request and a characteristic of the locking on the dataset.

12. The method of claim 1, wherein determining that execution of one or more data queries might result in heat generation in excess of a heat rise limit at a source storage device comprises computing an indication of heat generation for each of the one or more data queries based, at least in part, on access plans associated with the one or more queries and at least one operating characteristic of the source storage device.

13. A computer program product for heat-intensive data placement, the computer program product comprising:
a machine-readable storage medium having computer usable program code embodied therewith, the computer usable program code configured to:
determine that execution of one or more data queries might result in heat generation in excess of a heat rise limit at a source storage device, wherein the one or more data queries are associated with a dataset, wherein the source storage device hosts the dataset, wherein the source storage device is associated with a first cooling area of a plurality of cooling areas, wherein the computer usable program code configured to determine that the execution of one or more data queries might result in heat generation in excess of the heat rise limit at the source storage device comprises the computer usable program code configured to:
determine that the one or more data queries operate on the dataset;
determine one or more access plans that correspond to the one or more data queries;
compute an overall power consumption of the one or more access plans; and
determine that the overall power consumption exceeds a power consumption threshold;
select a second cooling area of the plurality of cooling areas of one or more data centers to accommodate the heat generation based, at least in part, on cooling characteristics of a plurality of cooling appliances of the plurality of cooling areas, wherein each cooling area of the plurality of cooling areas is serviced by a set of one or more cooling appliances of the plurality of cooling appliances;
determine a target storage device associated with the second cooling area; and
move the dataset from the source storage device to the target storage device.

14. The computer program product of claim 13, wherein the cooling characteristics of the plurality of cooling appliances comprise at least one of a physical location of each of the plurality of cooling appliances, a cooling efficiency of the each of the plurality of cooling appliances, a power consumption of the each of the plurality of cooling appliances, a cooling capacity of the each of the plurality of cooling appliances, and an amount of airflow generated by the each of the plurality of cooling appliances.

15. The computer program product of claim 13, wherein the computer usable program code configured to determine that the execution of the one or more data queries might result in heat generation in excess of the heat rise limit at the source storage device comprises the computer usable program code configured to:
determine that the source storage device hosts the dataset; and
determine a device identifier of the source storage device.

16. The computer program product of claim 13, wherein the computer usable program code configured to determine the target storage device associated with the second cooling area comprises the computer usable program code configured to:
identify a plurality of potential target storage devices associated with the plurality of cooling areas, wherein the plurality of potential target storage devices include the target storage device; and
determine power consumptions to move the dataset from the source storage device to each of the plurality of potential target storage devices, wherein the target storage device has a lowest of the power consumptions.

17. The computer program product of claim 13, wherein the computer usable program code configured to move the dataset from the source storage device to the target storage device comprises the computer usable program code configured to determine that the dataset is not locked.

18. An apparatus comprising:
a processor;
a network interface coupled with the processor; and
a machine readable storage medium having computer usable program code embodied therewith, the computer usable program code executable by the processor to cause the apparatus to,
determine that execution of one or more data queries might result in heat generation in excess of a heat rise limit at a source storage device, wherein the one or more data queries are associated with a dataset, wherein the source storage device hosts the dataset, wherein the source storage device is associated with a first cooling area of a plurality of cooling areas, wherein the computer usable program code executable by the processor to cause the apparatus to determine that execution of one or more data queries might result in heat generation in excess of the heat rise limit at the source storage device comprises computer usable program code executable by the processor to cause the apparatus to,
determine that the one or more data queries operate on the dataset;
determine one or more access plans that correspond to the one or more data queries;
compute an overall power consumption of the one or more access plans; and
determine that the overall power consumption exceeds a power consumption threshold;
select a second cooling area of the plurality of cooling areas of one or more data centers to accommodate the heat generation based, at least in part, on the cooling characteristics of a plurality of cooling appliances of the plurality of cooling areas, wherein each cooling area of the plurality of cooling areas is serviced by a set of one or more cooling appliances of the plurality of cooling appliances;
determine a target storage device associated with the second cooling area; and
move the dataset from the source storage device to the target storage device.

* * * * *